(12) United States Patent
Borsoi

(10) Patent No.: US 7,946,007 B2
(45) Date of Patent: May 24, 2011

(54) DEVICE FOR BLOCKING FLEXIBLE STRANDS

(75) Inventor: Bruno Borsoi, Vittorio Veneto (IT)

(73) Assignee: Salomon S.A.S., Metz-Tessy (FR)

( * ) Notice: Subject to any disclaimer, the term of this patent is extended or adjusted under 35 U.S.C. 154(b) by 927 days.

(21) Appl. No.: 11/626,604

(22) Filed: Jan. 24, 2007

(65) Prior Publication Data

US 2007/0169380 A1   Jul. 26, 2007

(30) Foreign Application Priority Data

Jan. 25, 2006   (FR) ...................................... 06 00694

(51) Int. Cl.
*A43C 11/00* (2006.01)
*A43C 7/00* (2006.01)
*F16G 11/10* (2006.01)

(52) U.S. Cl. ...................... 24/712.5; 24/712.6; 24/712.7; 24/136 R; 24/134 P; 24/134 KB; 36/50.1; 114/218

(58) Field of Classification Search .................. None
See application file for complete search history.

(56) References Cited

U.S. PATENT DOCUMENTS

| 1,520,716 | A | * | 12/1924 | Judd .............................. 24/134 P |
| 3,204,311 | A | | 9/1965 | Laviano |
| 3,765,061 | A | * | 10/1973 | Nash .............................. 24/134 P |
| 4,766,835 | A | * | 8/1988 | Randall et al. .................. 114/218 |
| 4,807,333 | A | | 2/1989 | Boden |
| 5,477,593 | A | | 12/1995 | Leick |
| 6,339,867 | B1 | | 1/2002 | Azam |
| 6,775,928 | B2 | * | 8/2004 | Grande et al. .................. 36/50.1 |
| 6,802,439 | B2 | | 10/2004 | Azam et al. |
| 2005/0005477 | A1 | | 1/2005 | Borsoi |
| 2006/0174460 | A1 | | 8/2006 | Borsoi |
| 2008/0250618 | A1 | * | 10/2008 | Stramare et al. ............. 24/712.7 |

FOREIGN PATENT DOCUMENTS

| DE | 39 20 266 A1 | 1/1991 |
| EP | 1 103 198 A1 | 5/2001 |
| FR | 2 827 486 A1 | 1/2003 |
| GB | 2 334 661 A | 9/1999 |

* cited by examiner

*Primary Examiner* — Jack W. Lavinder
(74) *Attorney, Agent, or Firm* — Greenblum & Bernstein, P.L.C.

(57) ABSTRACT

A blocking device adapted to act on at least one lace or strand, the blocking device including a body, a first cavity defining a first pathway for the strand, the device including a first blocking member, a first guide for guiding the first blocking member relative to the body, and first elastic member to bias the first blocking member in a direction to press the strand against a surface of the pathway, the device functioning by cooperation of a first blocking member with the first pathway for blocking the strand by a wedging effect. The first cavity is open, so as to enable the strand to be inserted and disengaged in a direction other than that of the pathway.

18 Claims, 3 Drawing Sheets

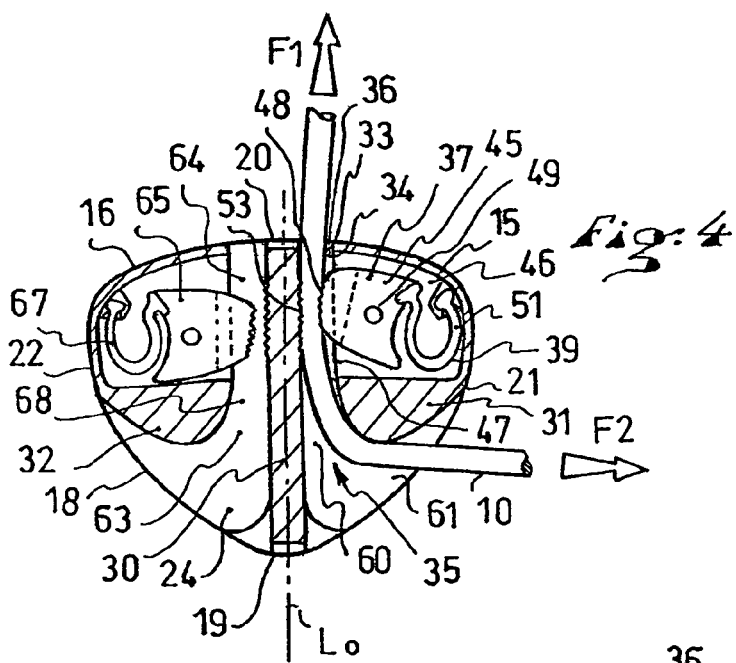
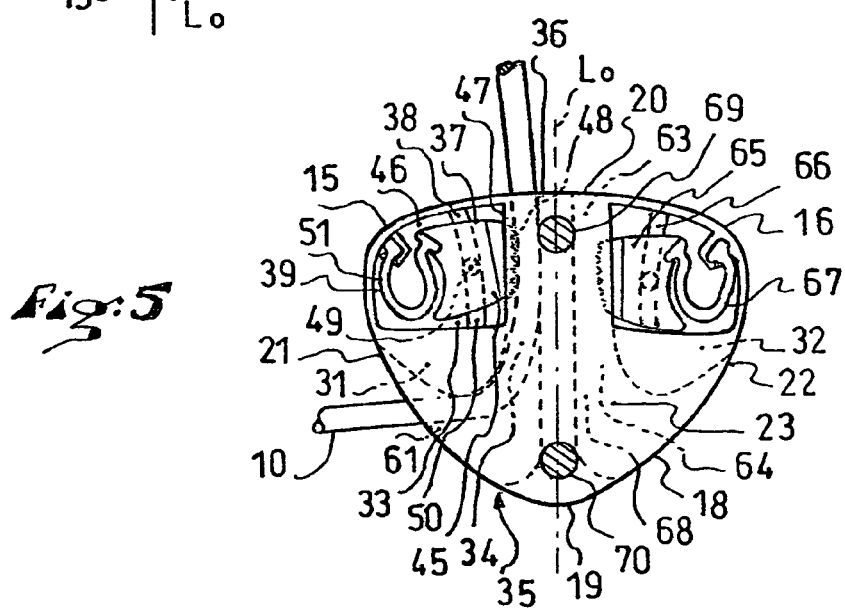
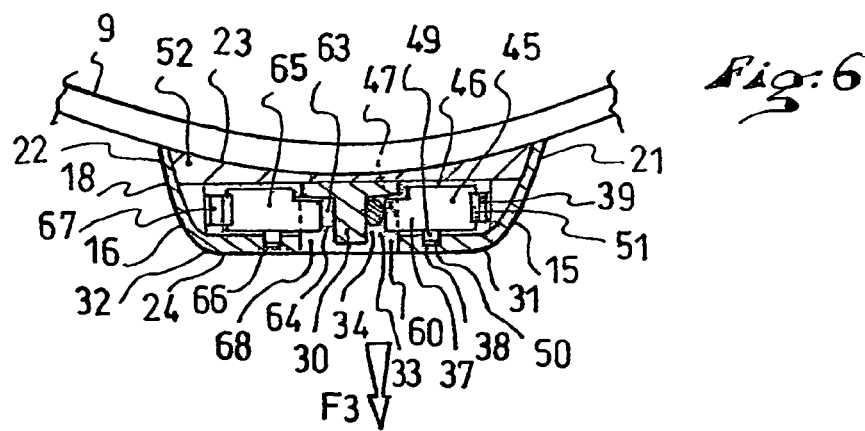

DEVICE FOR BLOCKING FLEXIBLE STRANDS

CROSS-REFERENCE TO RELATED APPLICATION

This application claims priority under 35 U.S.C. §119 of French Patent Application No. 06.00694, filed on Jan. 25, 2006, the disclosure of which is hereby incorporated by reference thereto in its entirety.

BACKGROUND OF THE INVENTION

1. Field of the Invention

The invention relates to a mechanical device for blocking flexible strands such as cables, ropes, strings, laces, other filiform elements or any other such product with a similar appearance or shape.

More specifically, the invention relates to the blocking of laces used in tightening shoes, boots, and other types of footwear. Thus, the invention also relates to an article of footwear provided with a blocking device, as well as to a lace tightening mechanism provided with a blocking device.

Yet more specifically, the invention relates to the field of sports and especially to footwear for snowsurfing or snowboarding, alpine skiing, cross-country skiing, other types of skiing, roller or ice skating, cycling, hiking, walking, or the like, as well as to tightening mechanisms for bindings, products such as backpacks, which include such strands for the tightening and/or the compression of these products or parts thereof.

2. Description of Background and Relevant Information

It is known to block flexible strands by means of a blocking device.

For instance, the patent document FR 2 827 486 discloses a blocking device that acts on at least one string. The device includes a body, one cavity of which defines a pathway for the passage of the string, the device including a blocking member, a means for guiding the blocking member with respect to the body, and an elastic means. The elastic means biases the blocking member in a direction for pressing the string in the pathway. The device according to the document FR 2 827 486 functions by cooperation of the blocking member with the pathway for blocking the string through a wedging effect. The string is blocked in a direction referred to as the wedging direction, and freely slides with respect to the body in the direction opposite the wedging direction. The blocking is all the more substantial as the tension on the string is significant. Thus, this device guarantees that the string is stably maintained during a tensioning, and prevents an ill-timed release or loosening of the string. If this device is used on a shoe, the shoe's upper remains tightened during use. The string is freed by manual action on a pusher associated with the blocking member, combined with a bias, also manual, of the portions tightened by the device. For example, if the device is used to tighten the upper of a shoe, the unblocking pusher must be actuated while spacing the quarters of the upper apart. The spacing apart causes the displacement of the string with respect to the body, in a direction opposite the wedging direction. The loosening of the tightened object is not immediate. The manipulations that lead to the complete loosening of the object take time and the motions required to carry them out must be learned. In other words, the loosening of an object, tightened with the device according to the document FR 2 827 486 is somewhat time-consuming and complicated.

SUMMARY OF THE INVENTION

In view of the above, the invention provides an improved blocking device, or blocker. In particular, the invention quickens the tightening or loosening of an object and, further, makes such tightening or loosening easier.

More particularly, the invention makes tightening and/or loosening an article of footwear easier, in terms of the length of time required to carry out the necessary manipulations.

Thus, the invention proposes a blocker, or blocking device, acting on at least one strand, string, lace, cable, rope, or other such element, hereafter referred to as a strand or lace. In a particular embodiment, the blocker includes a body, a first cavity which defines a first pathway for the strand, the blocker including a first blocking member, a first mechanism for guiding the first blocking member relative to the body, and a first elastic mechanism provided to bias the first blocking member in a direction for applying pressure on the strand in the pathway, the blocker functioning by cooperation of the first blocking member with the first pathway for blocking the strand by a wedging effect.

The pathway of the blocking device according to the invention is open so as to allow the strand to be inserted or removed in a direction other than that of along the pathway.

It is therefore possible to release the strand outside of the device without having to slide it along the pathway. The release is carried out without requiring to bias a member of the blocking device, or to move or bias parts of an object associated with the blocking device.

In fact, freeing the strand is done with a simple manual action on the strand itself, excluding another action.

The strand is no longer maintained by the device, once it is freed therefrom. As a result, the object associated with the device is no longer closed or tightened once the strand is free. This is especially true in the case of footwear.

Advantages resulting from these arrangements are especially the speed and ease of loosening an object associated with or including a device according to the invention.

The tightening is also carried out quickly and easily.

BRIEF DESCRIPTION OF DRAWINGS

Other characteristics and advantages of the invention will be better understood from the description that follows, with reference to the annexed drawings showing, according to a non-limiting embodiment, how the invention can be implemented, and in which:

FIG. 4 is a cross section of a plane, parallel to a support surface of the blocking devices, along the line IV-IV of FIG. 3;

FIG. 5 is a view of the support surfaces of the blocking devices, along the line V-V of FIG. 3;

FIG. 6 is a cross section along the line VI-VI of FIG. 2.

DETAILED DESCRIPTION OF THE INVENTION

Although the embodiment hereinafter described more particularly relates to the field of snowboarding, i.e., boots for snowboarding in particular, it is to be understood that the invention also relates to other fields of endeavor, as mentioned above, and it relates to boots, shoes, and footwear having low uppers, i.e., the upper edge of which extends below the ankle, mid-uppers, i.e., upper edge at the ankle, and high uppers, i.e., upper edge above the ankle.

The exemplary embodiment of the invention described herein is shown in FIGS. 1 to 6.

Figure 1:
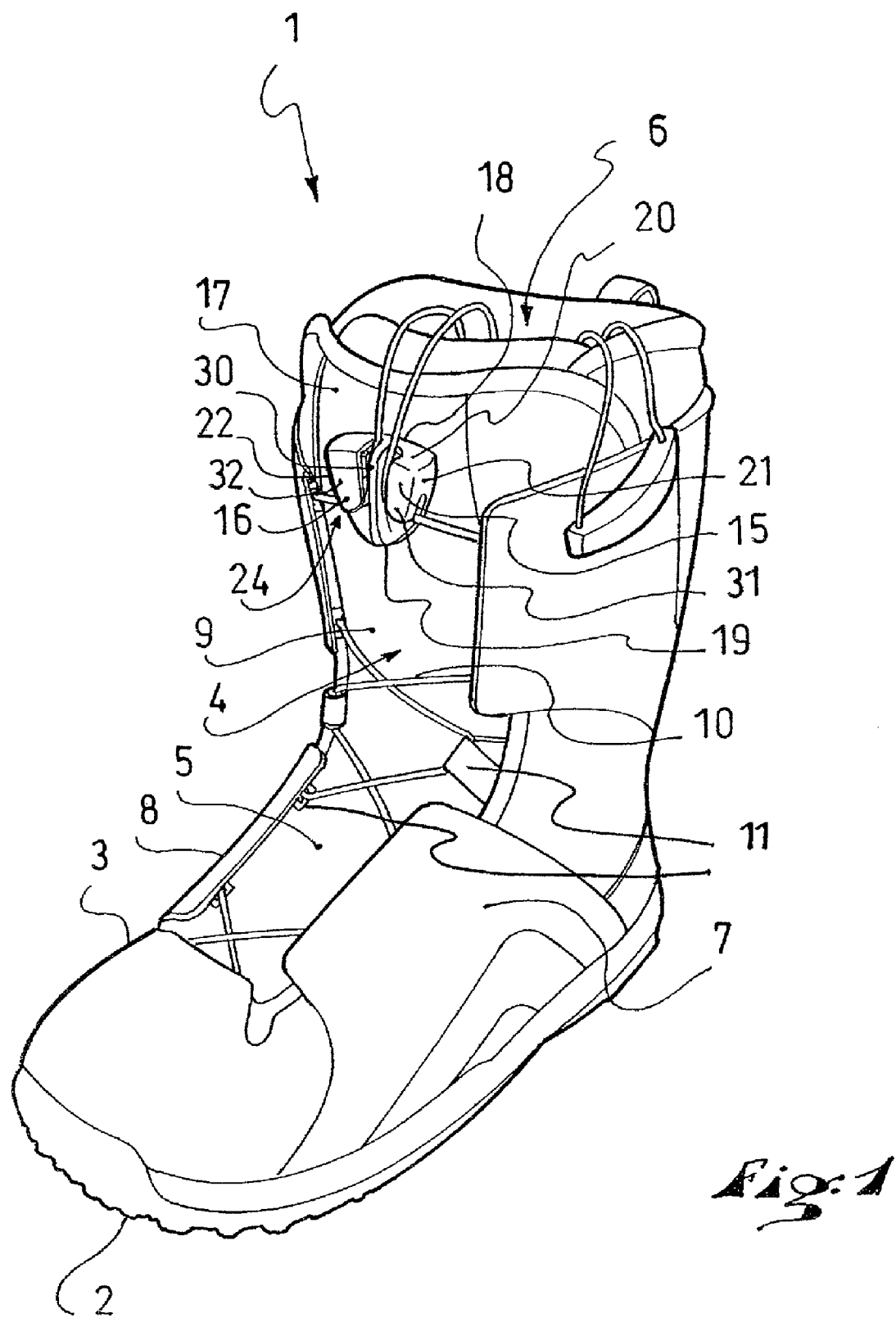
FIG. 1 is a general front perspective view of a boot including, in particular, strands and a blocker according to the a particular embodiment of the invention, including first and second blocking devices.

As shown in FIG. 1, a snowboard boot 1 includes an external sole 2 and an upper 3 extending upwardly from the sole 2. An opening 4 of the upper 3 includes a longitudinally extending slot 5 arranged and connected to an upper somewhat circular opening 6. The slot 5 separates a lateral quarter 7 from a medial quarter 8 of the upper 3, which allows the wearer to put on and remove the boot by relatively spacing apart and bringing closer together the quarters 7, 8. The circular opening 6 is provided for the passage of the lower part of a user's leg. In addition, the tongue 9 is provided to close the slot 5, i.e., by extending transversely between the lateral and medial quarters of the upper.

To tighten or loosen the upper 3, a reversible tightening arrangement has been provided. The tightening arrangement includes a lace 10 that contributes to bringing lateral and medial quarters 7, 8 closer together, or on the contrary, to enable them to be spaced apart. The lace 10 follows a pathway in the area of the slot 5, between the quarters 7, 8. Keepers 11 arranged on each side of the slot, on the edges of the quarters, 7, 8, are provided to guide the lace 10 along a passageway in a tightening zone. The tightening zone for the upper of the article of footwear shown in FIG. 1 is thereby comprised of the lace 10 and the keepers 11. Although the term lace is used hereinafter for convenience, the invention encompasses the use of other flexible elements or strands, including, but not limited to, cables, ropes, strings, laces, other filiform elements, any of which can have a circular, oval, rectangular or other cross-sectional shape, and other such product with a similar appearance or shape.

The arrangement for tightening the upper 3, in the exemplary embodiment that is illustrated, also includes a blocker that includes a first device 15 for blocking the lace 10 and a second device 16 for blocking the lace 10. As will be better understood from the following description, these devices are affixed to one another. The devices 15, 16, collectively referred to as a blocker or a blocking device, are affixed to the tongue 9 of the boot upper, for example, by any means or expedient known to those skilled in the art, such as screws, rivets, glue, stitching, or the like.

More specifically, the blocking devices 15, 16 are located toward a free end 17, or upper end, of the tongue 9. As will be better understood from the following description, this enables an easier manipulation of the tightening arrangement of the upper 3. However, it could also be provided for the blocking devices 15, 16 to be positioned elsewhere on the tongue 9, or even fastened to the upper 3, for example in the area of the quarters, independently or together.

Figure 2:
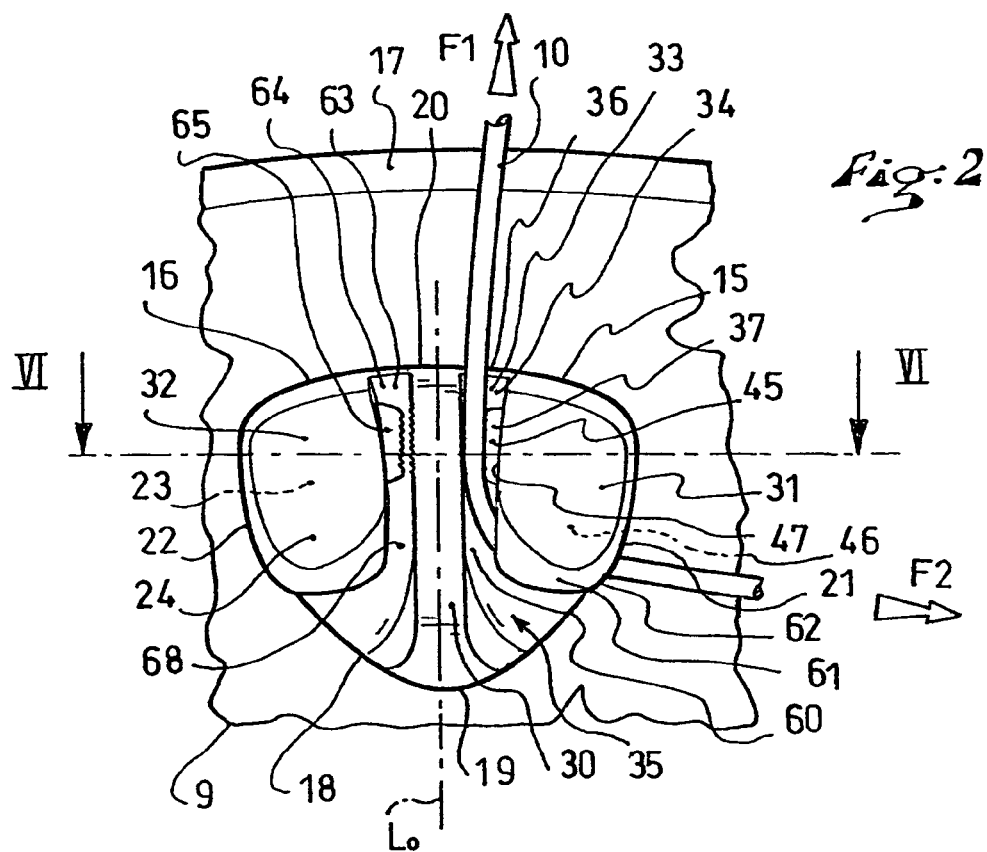
FIG. 2 is a view of the sides of the free surfaces of two blocking devices associated with the boot.
Figure 3:
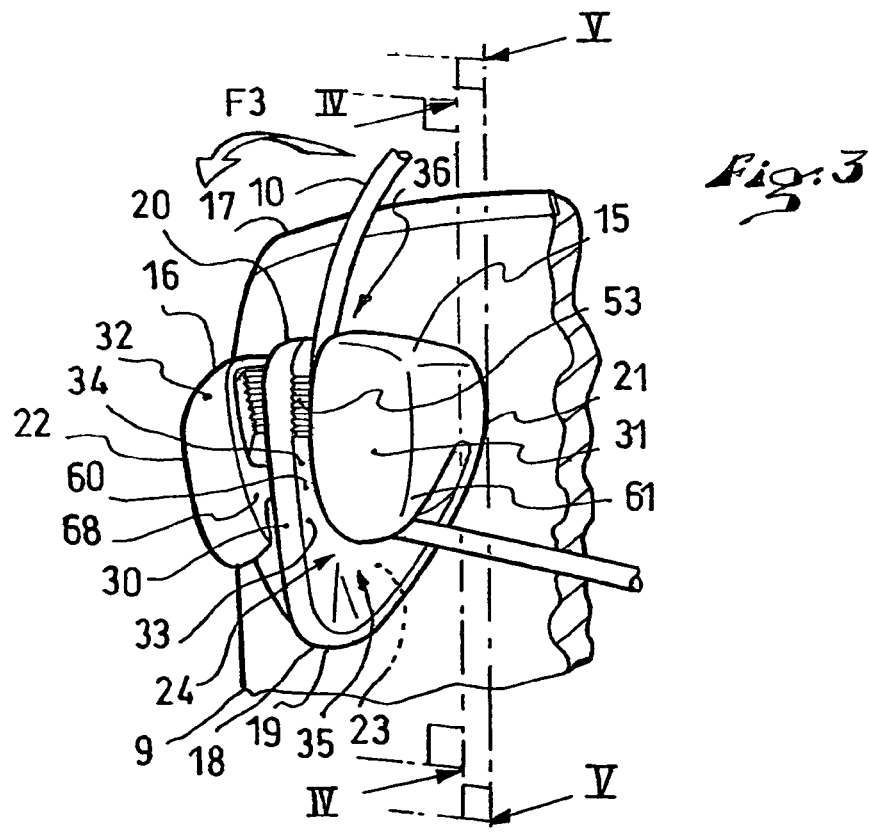
FIG. 3 is a perspective view of the blocking devices associated with the boot.

According to the invention, as shown in FIGS. 2 and 3, in particular, the blocking devices 15, 16 include a common element 18, referred to as the body. The body 18 extends in the area of the two devices 15, 16 to facilitate the manufacture of the boot. The first device 15 is associated with, or affixed to, the second device 16 by the means of the body 18. This means that the second device 16 is affixed to the first device 15 by means of the body 18. Alternatively, the devices 15, 16 could be provided to each include a separate body.

The body 18 extends longitudinally between a first end 19 and a second end 20, transversely between a first edge 21 and a second edge 22, and height-wise between a support surface 23 and a free surface 24. The support surface 23 is affixed to the upper 3 of the boot, in this case the tongue 9 of the upper. Consequently, the free surface 24 is directly accessible outside the upper 3.

The body 18 and the devices 15, 16 are symmetrical with respect to a central longitudinal axis Lo of the body 18.

Thus, the body 18 includes an intermediate longitudinal spine or ridge 30 that projects on the side of the free surface 24 and that, as shown in the illustrated embodiment, is central between the opposite edges 21, 22, but could be otherwise located. The body 18 also includes a first island 31 on the side of the first edge 21, as well as a second island 32 on the side of the second edge 22. The islands 31, 32 are symmetrical along the longitudinal axis Lo, but then may not be symmetrical.

The first blocking device 15 includes the first island 31 and a portion of the ridge 30 facing the island. Similarly, the second blocking device 16 includes the second island 32 and a portion of the ridge 30 opposite the island.

For simplicity, given that the blocking devices 15, 16 are arranged the same way, only one of them—the first device 15—is described in detail hereinafter.

As can be understood from all of FIGS. 1 to 6, the first blocking device 15 has a first cavity 33, which extends from the first end 19 up to the second end 20 of the device 15, between the longitudinal ridge 30 and the first island 31. The first cavity 33 also extends along and above the support surface 23, the bottom of the cavity 33. Thus, the first cavity 33 defines a first pathway 34 for the passage of the lace 10. The pathway 34 is longitudinally demarcated by a first opening 35 located toward the first end 19, and a second opening 36 located toward the second end 20. Thus, the lace 10 can slide in the pathway 34 between the openings 35, 36, in parallel with the support surface 23.

To allow the lace 10 to be temporarily immobilized in the pathway 34, in a direction parallel to the pathway or parallel to the support surface 23, a first blocking mechanism is provided. The first blocking mechanism enables the lace 10 to slide in a direction for tightening the boot 1, and prevents the lace from sliding in a loosening direction. As will be further described hereinafter, the sliding direction here extends from the first end 19 toward the second end 20 of the body 18. The opposite blocking direction, that of blocking the lace, is oriented in the direction from the second end 20 toward the first 19.

The first blocking mechanism includes a first blocking member 37, a first-blocking-member guide 38 for guiding the first blocking member 37 relative to the body 18, and a first elastic biaser 39 provided to bias the first blocking member 37 in a direction for pressing the strand 10 against a surface of the first pathway 34.

The blocking member 37 includes, for example, a sector 45 housed in an open cavity 46 of the first island 31. The sector 45 projects from the cavity 46 into the first pathway 34 through an opening 47 of the island 31. The sector 45 has teeth 48 provided to press against the lace 10.

The first-blocking-member guide 38 includes a pin 49, extending from the sector 45, and a guideway 50, in the form of a groove, housed in the cavity 46 of the island 31, the groove being provided to receive and guide the pin 49. The pin 49 is shown to be cylindrical and forms, with the sector 45, a unitary, i.e., one-piece, element. However, the pin could be made in any of other shapes, such as that of a tongue, and could be affixed to the sector 45, such as by nesting therein, rather than being unitary therewith.

The groove 50 is housed in the free surface 24, opposite the cavity 46 of the first island 31. The groove 50 extends in the cavity 46 of the island 31 along a path so that, from the second end 20 of the device 15, the path of the groove 50 comes closer to the ridge 30 as the path extends away from the end 20. In other words, from the second end 20 toward the first end 19, the groove 50 directs the pin 49 toward the central ridge 30. Consequently, the groove 50 also directs the sector 45 toward the ridge 30. The groove 50 is slightly curved, but could also be straight within the scope of the invention.

Finally, the first elastic biaser 39 constantly biases the blocking member 37, and thus the sector 45, away from the second end 20 and closer to the ridge 30 or the first pathway 34. In other words, the first elastic biaser 39 biases the blocking member 37 in a direction that is effective to block the lace 10. The first elastic biaser 39 includes a spring 51, which is generally C-shaped. The spring 51 extends in the cavity 46 of the first island 31 between the first edge 21 and the sector 45. The spring 51 is nested in the first edge 21 and in the sector 45. The spring 51 and the sector 45 are therefore two distinct elements. However, they could also be provided to form a unitary, i.e., one-piece, element.

To assemble the first device 15, the sector 45 and the spring 51 are inserted in the cavity 46 of the island 31 on the side of the support surface 23. In order to ensure cohesion with the first device 15, a hood 52 for closing the cavity 46 on the side of the support surface 23 is provided. The hood 52 is fixed to the body 18 by any means. For example, it can be affixed thereto by nesting, gluing, or the like. The spring 51 pushes the sector 45 toward the ridge 30. Thus, the lace 10 is constantly pinched between the sector 45 and the ridge 30. If the lace 10 were to be moved in the direction of the arrow F1 to slide from the first end 19 toward the second end 20, the sector 45 is driven toward the second end 20 and in a direction for moving away from the ridge 30 while being guided by the groove 50. The lace 10 is minimally pinched and slides easily. The boot is tightened.

Conversely, if the lace 10 were to move in the direction along the arrow F2 in a loosening direction, which extends from the second end 20 toward the first end 19, the sector 45 is driven toward the first end 19, in a direction for moving closer to the ridge 30 by the groove 50. Thus, the cross section of the pathway 34 is reduced to the height of the sector 45. The lace 10 becomes very strongly pinched. In fact, the lace 10 becomes blocked between the ridge 30 and the sector 45. The blocking is all the more substantial as the tension on the lace 10 becomes more substantial. Furthermore, to improve the wedging effect even more, the ridge 30 has teeth 53 opposite the sector 45. During blocking, a tension force is maintained in the lace between the blocking device 15 and the boot quarters 7, 8, (more particularly, between the blocking member 37 and the boot quarters), the latter being held in a tightened position by means of the tension force.

For the purpose of loosening the first blocking device 15, the user must act on the lace 10. Indeed, the blocking device 15 does not include an unlocking control member. It is not possible to manually act on the device 15 to loosen the boot. Consequently, a first disengagement opening 60 is arranged in the body 18. The opening 60 has the shape of a notch made in the free surface 24. The opening 60 is therefore parallel to the ridge 30 and extends along the first cavity 33 and the first pathway 34. In other words, the opening 60 opens the first pathway 34 on the side of the free surface 24. The opening 60 opens out outside the first device 15. Furthermore, the opening 60 communicates with the first and second openings 35, 36, respectively, of the first pathway 34. That is, the pathway is open; the lace is not surrounded within the body 18 of the blocking device. Therefore, to unblock the lace 10 and, thereby to remove, and to free, the lace from the blocking device, one only needs to manually bias the lace in the direction along the arrow F3, i.e., in a direction away from the upper 3 of the boot. This direction is substantially perpendicular to the upper 3, in particular relative to the tongue 9, and also perpendicular to the support surface 23. The direction for disengaging/freeing the lace 10, outside from the pathway 34, is also substantially perpendicular to the direction for sliding the lace in the first device 15. Advantages related to this structure are the ease and speed by which the lace is unblocked. Only one movement is necessary to free the lace 10 completely from the first device 15.

To tighten the boot 1 again, one only has to insert the lace 10 again in the first cavity 33 through the first opening 60. This operation is also easy and fast. Then, the lace is tensioned, as previously described, by applying traction in the direction of the first pathway 34.

In addition, the first blocking device 15 includes a lace keeper 61, which includes an extension 62 originating from the first island 31 and directed toward the first end 19, and spaced apart from the support surface 23. The extension, as shown in FIGS. 2 and 3, provides a projecting guide surface extending above, or over, the lace and the bottom of the cavity 33 on the "tension side" of the blocking device while the lace is blocked in tension, i.e., between the blocking member 37 and the entry of the lace to the blocking device. The space between the extension 62, the island 31, and the support surface 23 forms the keeper 61. The keeper 61 is open, meaning the lace 10 can be disengaged from the keeper at the same time the lace 10 is disengaged from the opening 60 of the first pathway 34. That is, the body 18 and the keeper 61 of the blocking device do not surround the lace 10. However, one could alternatively leave the keeper closed. Depending on the use of the blocker of the invention, the keeper can be omitted, so as to have only a blocking effect.

When it slides in the pathway 34, the lace 10 can also slide in the keeper 61. In so doing, the lace 10 slides in a plane that is substantially parallel to the support surface 23 or to the free surface 24, or to the portion of the upper to which a blocking device has been affixed. In this case, the sliding of the lace 10, when moved in the tightening direction, is done in a plane enveloping the tongue 9. The direction for disengaging the lace 10 by means of the opening 60, for loosening the boot as described above, is substantially perpendicular to this enveloping plane. Locally, that is, in the area of each blocking device, the lace 10 remains in the median plane (or envelope surface) of the cavity 33 or of the pathway 34.

What has been described for the first device 15 can also apply to the second device 16. Therefore, to make the drawing easier to understand, with respect to the second device 16, there is a second cavity 63 defining a second pathway 64 for the strand or lace, a second blocking member 65, a second guideway 66 for guiding the second blocking member 65, a second elastic biaser 67, and a second disengagement opening 68.

The blocker, i.e., the blocking devices 15, 16, are affixed to the upper of the boot, i.e., affixed to the tongue 9, by pins 69, 70, as shown in FIG. 5, although another expedient can be used within the scope of the invention. The pins 69, 70, arranged on the side of the support surface 23 can be hollow and receive screws (not shown), for example. The screws can be screwed in the pins through the upper 3. Other connections are also possible.

In general, the invention can be implemented using materials and according to techniques known to one having ordinary skill in the art.

In a particular embodiment, every component of the blocker, or most of the components of the blocker, can be made of a plastic material.

The invention is not limited to the particular embodiments herein shown and described and includes all the technical equivalents that fall within the scope of the claims that follow.

In particular, although one body 18 common to the two blocking devices 15, 16 has been provided, one can alternatively have one body per device.

An object can also be provided to have more than two blocking devices.

In the case of an article of footwear, the embodiment shown and described is directed to a boot, i.e., an article of footwear having a high upper. Alternatively, the article of footwear can be provided to have a low upper. Furthermore, a blocker according to the invention can be positioned anywhere on the upper.

Although the embodiment shown and described relates to an article of footwear in the form of a boot, the invention also encompasses a liner adapted to be housed within the article of footwear, as well as other objects such as bags and garments.

Moreover, the invention relates to any tightening device that includes a device for blocking a string, a strand, a lace, or other such element.

The invention claimed is:

1. A blocking device for blocking movement of at least one strand, said blocking device comprising:
   a body;
   a cavity defining a pathway for the strand, the pathway having a bottom and an entry and an exit for the strand relative to the body;
   a blocking member adapted to engage the strand while the strand is in said pathway;
   a blocking-member guide for guiding movement of said blocking member relative to said body;
   an elastic biaser for biasing said blocking member in a direction to press the strand against movement within said pathway with a wedging effect and to maintain a tension on the strand between the blocking member and the entry of the pathway;
   said pathway comprising an open pathway between the entry and the exit to allow the strand to be inserted into the pathway and to be freed from the blocking device other than in a direction along the pathway;
   said open pathway being defined in part by a keeper comprising a guide surface extending over the bottom of the cavity, said guide surface being positioned along the pathway between the blocking member and the entry of the pathway.

2. A blocking device according to claim 1, wherein:
   said body has a height extending between a support surface, adapted to be mounted against an object, and a free surface;
   the body further comprises:
      a longitudinal ridge projecting in a direction from the support surface toward the free surface;
      an island;
   said cavity extends between said longitudinal ridge and said island;
   said bottom of said cavity extends along and above said support surface of said body.

3. A blocking device according to claim 1, wherein:
   said keeper is an open keeper for guiding the strand.

4. A blocking device for blocking movement of at least one strand, said blocking device comprising:
   a body;
   a cavity defining a pathway for the strand;
   a blocking member adapted to engage the strand while the strand is in the pathway;
   a blocking-member guide for guiding movement of the blocking member relative to the body;
   an elastic biaser for biasing the blocking member in a direction to press the strand against movement within the pathway with a wedging effect;
   the cavity being open to allow the strand to be inserted into the pathway and to be removed from the pathway other than in a direction along the pathway;
   the body having a height extending between a support surface, adapted to be mounted against an object, and a free surface;
   the body further, comprising:
      a longitudinal ridge projecting in a direction from the support surface toward the free surface;
      an island;
   the cavity extending between the longitudinal ridge and the island;
   the cavity has a bottom above the support surface of the body;
   the blocking member comprising a sector housed in an open cavity of the island;
   said pathway is defined in part by a keeper comprising a guide surface structured and arranged to extend over the strand, said guide surface being positioned along the pathway between the blocking member and the entry of the pathway.

5. A blocking device according to claim 4, wherein:
   said sector has teeth facing said pathway for engagement with the strand;
   said ridge has teeth, facing said pathway and opposite said sector, for engagement with the strand.

6. A blocking device according to claim 4, wherein:
   said blocking-member guide comprises:
      a pin originating from said sector;
      a guideway housed in said open cavity of said island, said guideway receiving and guiding movement of said pin.

7. A blocking device according to claim 4, wherein:
   said elastic biaser comprises a spring extending in said open cavity of said island between said ridge of said body and said sector.

8. A blocking device according to claim 7, wherein:
   said spring and said sector are two distinct elements.

9. A blocking device according to claim 7, wherein:
   said spring and said sector form a unitary one-piece element.

10. A blocking device for blocking movement of at least one strand, said blocking device comprising:
    a body;
    a cavity defining a pathway for the strand;
    a blocking member adapted to engage the strand while the strand is in the pathway;
    a blocking-member guide for guiding movement of the blocking member relative to the body;
    an elastic biaser for biasing the blocking member in a direction to press the strand against movement within the pathway with a wedging effect;
    the cavity being open to allow the strand to be inserted into the pathway and to be removed from the pathway other than in a direction along the pathway;
    the body having a height extending between a support surface, adapted to be mounted against an object, and a free surface;
    the body further comprising:
       a longitudinal ridge projecting in a direction from the support surface toward the free surface;
       an island;
    the cavity extending between the longitudinal ridge and the island;

the cavity has a bottom above the support surface of the body;
a keeper for the strand, said keeper including an extension originating from the island and extending over the strand.

11. A blocking device for blocking movement of at least one strand, said blocking device comprising:
a first blocking device and a second blocking device, each of said first and second blocking devices adapted to block movement of a respective length of said strand;
said first blocking device comprising:
a body;
a first cavity defining a first pathway for the strand, the pathway having an entry and an exit for the strand relative to the body;
a first blocking member adapted to engage the strand while the strand is in said first pathway;
a first-blocking-member guide for guiding movement of said first blocking member relative to said body;
a first elastic biaser for biasing said first blocking member in a direction to press the strand against movement within said first pathway with a wedging effect and to maintain a tension on the strand between the blocking member and the entry of the pathway;
said first pathway comprising an open pathway between the entry and the exit to allow the strand to be inserted into said pathway and to be freed from the blocking device other than in a direction along said pathway;
said open pathway being defined in part by a guide surface extending over the strand, said guide surface being positioned along the pathway between the blocking member and the entry of the pathway.

12. A tightening device for an object, said tightening device comprising:
a strand adapted to be connected to the object; and
a blocking device for blocking movement of the strand relative to the object, said blocking device comprising:
a body;
a cavity defining a pathway for the strand, the pathway having an entry and an exit for the strand relative to the body;
a blocking member adapted to engage the strand while the strand is in said pathway;
a blocking-member guide for guiding movement of said blocking member relative to said body;
an elastic biaser for biasing said blocking member in a direction to press the strand against movement within said pathway with a wedging effect and to maintain a tension on the strand between the blocking member and the entry of the pathway;
said pathway comprising an open pathway between the entry and the exit to allow the strand to be inserted into the pathway and to be freed from the blocking device other than in a direction along the pathway;
said open pathway being defined in part by a projecting guide surface extending over the strand, said projecting guide surface being positioned along the pathway between the blocking member and the entry of the pathway.

13. An article of footwear comprising:
an upper;
a device for tightening said upper on a foot and/or a lower leg of a wearer, said device for tightening comprising:
a strand connected to said upper; and
a device for blocking movement of said strand relative to said upper, said blocking device comprising:
a body;
a cavity defining a pathway for the strand, the pathway having an entry and an exit for the strand relative to the body;
a blocking member adapted to engage the strand while the strand is in said pathway;
a blocking-member guide for guiding movement of said blocking member relative to said body;
an elastic biaser for biasing said blocking member in a direction to press the strand against movement within said pathway with a wedging effect and to maintain a tension on the strand between the blocking member and the entry of the pathway;
said pathway being open between the entry and the exit to allow the strand to be inserted into the pathway and to be freed from the blocking device other than in a direction along the pathway;
said open pathway being defined in part by a projecting guide surface extending over the strand, said projecting guide surface being positioned along the pathway between the blocking member and the entry of the pathway.

14. An article of footwear according to claim 13, wherein:
said upper is a high upper having an upper edge adapted to extend above an ankle of a the wearer.

15. An object to be tightened, said object comprising:
a tightening zone comprising:
an edge portion of the object to be tightened;
at least one lace passageway extending along said edge portion;
at least one lace extending along and being guided by said at least one lace passageway and adapted to have a tension applied to said at least one lace;
said at least one lace comprising a first strand and a second strand;
a blocker for maintaining said tension on said at least one lace and for blocking movement of both of said first and second strands along respective lengths of said first and second strands, said blocker comprising:
a body;
a ridge extending height-wise in a direction away from a base of the body, the ridge extending length-wise between an entry end of the body and an exit end of the body;
a first blocking device and a second blocking device for blocking respective ones of the first and second strands of the at least one lace, the ridge positioned between the first and second blocking devices;
each of the first and second blocking devices comprising:
a cavity defining a lace pathway, one of the strands extending within the pathway between an entry and an exit of the pathway;
a blocking member structured and arranged for movement relative to the body of the blocker;
an elastic biaser for biasing the blocking member in a direction to engage said one of the strands while said one of the strands is in the pathway and to press said one of the strands against the ridge to block length-wise movement of said one of the strands;
the pathway being open between the entry and the exit of the pathway to allow the strand to be inserted into the pathway and to be freed from the blocking device other than in a direction along the pathway;
an island projecting in a direction away from a support surface of the body;

a keeper comprising a guide surface for guiding one of the first and second strands, said guide surface including a surface which is an extension of said island;

said guide surface of the keeper of each of the first and second blocking devices is positioned between the blocking member and the entry of the pathway;

said guide surface of the keeper of each of the first and second blocking devices extends over the strand.

16. An object to be tightened according to claim 15, wherein:

the object is an article of footwear including an upper and a sole;

the edge portion of the object to be tightened comprises a part of the upper.

17. An object to be tightened according to claim 15, wherein:

the edge portion of the tightening zone comprises a first edge portion, the tightening zone further comprising a second edge portion spaced apart from the first edge portion;

the at least one lace passageway of the tightening zone comprises a passageway of a lace keeper spaced apart from said blocker, the tightening zone comprising a plurality of keepers arranged on the first and second edge portions of the object to be tightened;

the at least one lace is along and is guided by said plurality of keepers.

18. An object to be tightened according to claim 17, wherein:

the object is an article of footwear including an upper and a sole;

the first and second edge portions of the object to be tightened are parts of the upper.

* * * * *